United States Patent [19]
Fischer

[11] 3,861,900
[45] Jan. 21, 1975

[54] CONTROL OF UNWANTED PLANTS
[75] Inventor: Adolf Fischer, Mutterstadt, Germany
[73] Assignee: Badische Anilin- & Soda-Fabrik Aktiengesellschaft, Ludwigshafen/Rhein, Germany
[22] Filed: Mar. 26, 1973
[21] Appl. No.: 344,565

[30] Foreign Application Priority Data
Apr. 22, 1972   Germany................. P 22 19 922

[52] U.S. Cl............................. 71/88, 71/92, 71/100, 71/111
[51] Int. Cl................................................ A01n 9/28
[58] Field of Search................................... 71/88, 92

[56] References Cited
UNITED STATES PATENTS
3,210,353   10/1965   Reicheneder et al.................. 71/92
3,689,507   9/1972   Gates et al.............................. 71/88

FOREIGN PATENTS OR APPLICATIONS
1,434,994   3/1966   France..................................... 71/92
1,419,362   10/1965   France..................................... 71/92

Primary Examiner—Glennon H. Hollrah
Attorney, Agent, or Firm—Johnston, Keil, Thompson & Shurtleff

[57] ABSTRACT

New and valuable process for controlling unwanted plants in important agricultural crops by treating the soil before emergence of the plants and treating the plants postemergence.

1 Claim, No Drawings

CONTROL OF UNWANTED PLANTS

The present invention relates to a process for controlling unwanted plants in important agricultural crops by treating the soil before emergence of the plants and treating the plants postemergence.

It is known that substituted thiol carbamates and bis-carbamates have a herbicidal action. However, their action is poor.

I have now found a process for controlling unwanted plants wherein the soil in which unwanted plant growth is to be prevented is treated before emergence of the unwanted plants with a. a compound of the formula

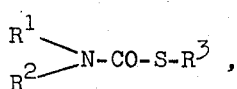

wherein $R^1$ denotes cyclohexyl, or bicycloalkyl or tricycloalkyl of a maximum of 10 carbon atoms, $R^2$ denotes lower alkyl or alkynyl of a maximum of 4 carbon atoms, and $R^3$ denotes lower alkyl of a maximum of 4 carbon atoms, or b. 1-phenyl-4-amino-5-chloropyridazone-(6), or c. a compound of the formula

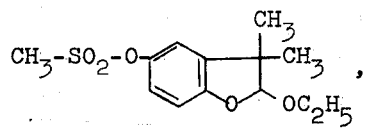

and, after emergence of the unwanted plants, the crop plants and unwanted plants are treated with d. a compound of the formula

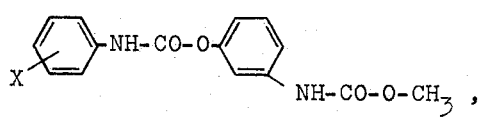

where X denotes methyl, and/or e. 1-phenyl-4-amino-5-chloropyridazone-(6).

This process ensures that the unwanted plants are destroyed without damage being caused to the crop plants, and it is therefore particularly suitable for controlling unwanted plants in crops such as rice, groundnuts, cotton, and Indian corn.

The active ingredients are especially effective on dicotyledonous seed weeds and monocotyledonous weed grasses, and are therefore suitable for controlling unwanted plants in crops of beet, spinach, potatoes, peas, beans and groundnuts.

Active ingredients $a$, $b$, $c$ and $e$ are applied in amounts of 1 to 5 kg per hectare, preferably 2 to 4 kg per hectare, and active ingredients $d$ in amounts of 1 to 3 kg per hectare, preferably 1.5 kg per hectare.

Active ingredients $a$, $b$ and $c$ are applied shortly before the crop plants are sown or planted and before emergence of the unwanted plants. They are therefore applied to the soil before the seedlings of the unwanted plants have pierced the surface. The active ingredients may be evenly applied to the soil or incorporated into the upper soil layer and uniformly distributed therein.

Active ingredients $d$ and/or $e$ are applied after the seedlings of the unwanted plants have pierced the surface. The seedlings develop leaves (seed leaves and genuine leaves) which take up active ingredients $d$ and/or $e$. These active ingredients are evenly applied to the leaves of both crop and unwanted plants for instance in the form of an aqueous spray liquor containing the active ingredient as a solution or suspension.

The active ingredients may be used as solutions, emulsions, suspensions, oil dispersions, granules or dusts. The form of application depends entirely on the purpose for which the agents are being used; in any case it should ensure a fine distribution of the active ingredient.

For the preparation of solutions to be sprayed direct, mineral oil fractions of medium to high boiling point, such as kerosine or diesel oil, further coal-tar oils and oils of vegetable or mineral origin, and cyclic hydrocarbons such as tetrahydronaphthalene and alkylated naphthalenes are suitable.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, wetting agent, adherent, emulsifying or dispersing agent and possibly solvent. Oils of various types may be added to ready-to-use spray liquors.

Dusts may be prepared by mixing or grinding the active ingredients with a solid carrier, e.g., clay or fertilizers.

Granules may be prepared by bonding the active ingredients to solid carriers.

Directly sprayable dispersions may also be prepared with oils.

The active ingredients may also be mixed with fertilizers, insecticides, fungicides and other herbicides.

EXAMPLE 1

An agricultural plot was sown with the seeds of the plants listed below. Treatment with the active ingredients I ethyl-N-ethyl-N-bicyclo-[2,2,1]-heptylthiol carbamate, 0.3 kg per hectare;

II N-1- or -2-bicyclo-(3,3,0)-octyl-N-ethylethylthiol carbamate, 0.4 kg per hectare;

III ethyl N-ethyl-N-cyclohexylthiol carbamate, 0.6 kg per hectare;

IV 3-methoxycarbonylaminophenyl-N-(3'-methylphenyl)-carbamate, 0.4 kg per hectare;

V 1-phenyl-4-amino-5-chloropyridazone-(6), 0.5 kg per hectare;

V + IV: 0.25 + 0.25 kg per hectare, was carried out as follows:

A with I, II, III, IV, V and V + IV before sowing;

B with I, II, III, IV, V and V + IV after emergence of the weeds and crop plants;

C with I, II, III and V before sowing combined with IV, V and V + IV after emergence of the weeds and crop plants.

The following figures show that the method C gives a better herbicidal action than methods A and B, combined with the same good crop plant compatibility.

Method A

| Active ingredient | I | II | III | IV | V | V+IV |
|---|---|---|---|---|---|---|
| kg/ha | 0.3 | 0.4 | 0.6 | 0.4 | 0.5 | 0.25+0.25 |
| Crop plants: | | | | | | |
| Beta vulgaris var. crassa | 0 | 0 | 0 | 0 | 0 | 0 |
| Beta vulgaris var. altissima | 0 | 0 | 0 | 0 | 0 | 0 |
| Unwanted plants: | | | | | | |
| Sinapis arvensis | 3 | 2 | 2 | 0 | 20 | 30 |
| Chenopodium album | 5 | 2 | 2 | 0 | 30 | 40 |
| Poa annua | 18 | 16 | 17 | 0 | 3 | 13 |
| Alopecurus myosuroides | 17 | 15 | 17 | 0 | 2 | 12 |
| Avena fatua | 13 | 13 | 14 | 0 | 2 | 13 |

0 = no damage
100 = complete destruction

Method B

| Active ingredient | I | II | III | IV | V | V+IV |
|---|---|---|---|---|---|---|
| kg/ha | 0.3 | 0.4 | 0.6 | 0.4 | 0.5 | 0.25+0.25 |
| Crop plants: | | | | | | |
| Beta vulgaris var. crassa | 0 | 0 | 0 | 0 | 0 | 0 |
| Beta vulgaris var. altissima | 0 | 0 | 2 | 0 | 0 | 0 |
| Unwanted plants: | | | | | | |
| Sinapis arvensis | 0 | 0 | 2 | 50 | 30 | 55 |
| Chenopodium album | 0 | 0 | 2 | 40 | 40 | 60 |
| Poa annua | 8 | 6 | 9 | 2 | 6 | 15 |
| Alopecurus myosuroides | 8 | 6 | 9 | 2 | 5 | 12 |
| Avena fatua | 7 | 5 | 6 | 2 | 5 | 10 |

0 = no damage, 100 = complete destruction

Method C

| Active ingredient | I+IV | I+V | I+V+IV | II+IV | II+V | II+V+IV |
|---|---|---|---|---|---|---|
| kg/ha | 0.3+0.4 | 0.3+0.5 | 0.3+0.25+0.25 | 0.4+0.4 | 0.4+0.5 | 0.4+0.25+0.25 |
| Crop plants: | | | | | | |
| Beta vulgaris var. crassa | 0 | 0 | 0 | 0 | 0 | 0 |
| Beta vulgaris var. altissima | 0 | 0 | 0 | 0 | 0 | 0 |
| Unwanted plants: | | | | | | |
| Sinapis arvensis | 70 | 70 | 80 | 60 | 65 | 77 |
| Chenopodium album | 60 | 70 | 80 | 50 | 55 | 75 |
| Poa annua | 60 | 65 | 70 | 40 | 45 | 50 |
| Alopecurus myosuroides | 50 | 50 | 55 | 45 | 48 | 50 |
| Avena fatua | 45 | 50 | 48 | 43 | 45 | 47 |

0 = no damage
100 = complete destruction

| Active ingredient | III+IV | III+V | III+V+IV | V+IV | V+V | V+V+IV |
|---|---|---|---|---|---|---|
| kg/ha | 0.6+0.4 | 0.6+0.5 | 0.6+0.25+0.25 | 0.5+0.4 | 0.5+0.5 | 0.5+0.25+0.25 |
| Crop plants: | | | | | | |
| Beta vulgaris var. crassa | 0 | 0 | 0 | 0 | 0 | 0 |
| Beta vulgaris var. altissima | 0 | 0 | 0 | 0 | 0 | 0 |
| Unwanted plants: | | | | | | |
| Sinapis arvensis | 60 | 65 | 75 | 80 | 80 | 90 |
| Chenopodium album | 55 | 58 | 78 | 83 | 85 | 100 |
| Poa annua | 55 | 57 | 63 | 45 | 50 | 55 |
| Alopecurus myosuroides | 53 | 55 | 60 | 40 | 47 | 45 |
| Avena fatua | 50 | 53 | 58 | 40 | 45 | 48 |

0 = no damage
100 = complete destruction

EXAMPLE 2

An agricultural plot was sown with the seeds of the plants listed below. Treatment with the active ingredients I   2-ethoxy-2,3-dihydro-3,3-dimethyl-5-benzofuranylmethanesulfonate, 0.5 per hectare;

II  3-methoxycarbonylaminophenyl-N-(3'-methylphenyl)-carbamate, 0.4 kg per hectare;

III 1-phenyl-4-amino-5-chloropyridazone-(6), 0.5 kg per hectare;

II + III: 0.25 + 0.25 kg per hectare was carried out as follows:

A with I, II, III and II + III before sowing;

B with I, II, III and II + III after emergence of the weeds;

C with I before sowing, combined with II, III and II + III after emergence of the weeds.

The figures given below show that method C gives a better herbicidal action than methods A and B, combined with superior crop plant compatibility.

| Method | A | | | | B | | | |
|---|---|---|---|---|---|---|---|---|
| Active ingredient | I | II | III | II+III | I | II | III | II+III |
| kg/ha | 0.5 | 0.4 | 0.5 | 0.25+0.25 | 0.5 | 0.4 | 0.5 | 0.25+0.25 |
| Crop plants: | | | | | | | | |
| Beta vulgaris | 2.5 | 0 | 0 | 0 | 4 | 0 | 0 | 0 |
| Unwanted plants: | | | | | | | | |
| Chenopodium album | 3 | 0 | 30 | 40 | 10 | 40 | 40 | 60 |
| Sinapis arvensis | 4 | 0 | 20 | 30 | 12 | 50 | 30 | 55 |
| Alopecurus myosuroides | 17 | 0 | 2 | 12 | 25 | 2 | 5 | 12 |
| Avena fatua | 16 | 0 | 2 | 13 | 11 | 2 | 5 | 10 |

| Method | C | | |
|---|---|---|---|
| Active ingredient | I+II | I+III | I+II+III |
| kg/ha | 0.5+0.4 | 0.5+0.5 | 0.5+0.25+0.25 |
| Crop plants: | | | |
| Beta vulgaris | 0 | 0 | 0 |
| Unwanted plants: | | | |
| Chenopodium album | 60 | 65 | 80 |
| Sinapis arvensis | 70 | 67 | 85 |
| Alopecurus myosuroides | 50 | 63 | 70 |
| Avena fatua | 48 | 55 | 68 |

0 = no damage
100 = complete destruction

EXAMPLE 3

In the greenhouse, loamy sandy soil was filled into pots and sown with the seeds of various plants. Treatment with the active ingredients I ethyl N-ethyl-N-cyclohexylthiolcarbamate, 0.1, 1.0 and 1.2 kg/hectare;

II 1-phenyl-4-amino-5-chloropyridazone-(6), 0.1, 1.0 and 1.2 kg/hectare;

III 2-ethoxy-2,3-dihydro-3,3-dimethyl-5-benzofuranylmethane sulfonate, 0.1, 1.0 and 1.2 kg/hectare;

IV 3-methoxycarbonylaminophenyl-N-(3'-methylphenyl)-carbamate, 0.1, 1.0 and 1.2 kg/hectare was carried out as follows:

A with I, II, III and IV before or after sowing;
B with I, II, III and IV after emergence of the weeds;
C with I + II, I + III, III + II and II before or after sowing and with II shortly before emergence of the seedlings, and with IV after emergence of the weeds. The results given below show that method C has a better herbicidal action than methods A and B, combined with the same good crop plant compatability.

| | Method A | | | | | | | | |
|---|---|---|---|---|---|---|---|---|---|
| Active ingredient | I | | | II | | | III | | |
| kg/ha | 0.1 | 1.0 | 1.2 | 0.1 | 1.0 | 1.2 | 0.1 | 1.0 | 1.2 |
| Crop plants: | | | | | | | | | |
| Beta vulgaris var. crassa | 0 | 0 | 0 | 0 | 0 | 0 | 0 | 4 | 4 |
| Beta vulgaris var. altissima | 0 | 0 | 0 | 0 | 0 | 0 | 0 | 4 | 4 |
| Unwanted plants: | | | | | | | | | |
| Sinapis arvensis | 0 | 8 | 9 | 10 | 30 | 35 | 0 | 10 | 11 |
| Chenopodium album | 0 | 7 | 8 | 13 | 42 | 43 | 0 | 10 | 12 |
| Poa trivialis | 2 | 40 | 42 | 1 | 17 | 17 | 5 | 48 | 50 |
| Alopecurus myosuroides | 3 | 60 | 63 | 0 | 12 | 13 | 4 | 45 | 47 |
| Avena fatua | 2 | 36 | 37 | 0 | 6 | 8 | 2 | 40 | 41 |

| | Method A | | |
|---|---|---|---|
| Active ingredient | IV | | |
| kg/ha | 0.1 | 1.0 | 1.2 |
| Crop plants: | | | |
| Beta vulgaris var. crassa | 0 | 0 | 0 |
| Beta vulgaris var. altissima | 0 | 0 | 0 |
| Unwanted plants: | | | |
| Sinapis arvensis | 0 | 0 | 0 |
| Chenopodium album | 0 | 0 | 0 |
| Poa trivialis | 0 | 0 | 0 |
| Alopecurus myosuroides | 0 | 0 | 0 |
| Avena fatua | 0 | 0 | 0 |

| | Method B | | | | | |
|---|---|---|---|---|---|---|
| Active ingredient | I | | | II | | |
| kg/ha | 0.1 | 1.0 | 1.2 | 0.1 | 1.0 | 1.2 |
| Beta vulgaris var. crassa | 0 | 0 | 0 | 0 | 0 | 0 |
| Beta vulgaris var. altissima | 0 | 3 | 3 | 0 | 0 | 0 |
| Unwanted plants: | | | | | | |
| Sinapis arvensis | 0 | 5 | 6 | 14 | 35 | 36 |
| Chenopodium album | 0 | 4 | 5 | 8 | 70 | 72 |
| Poa trivialis | 1 | 15 | 16 | 2 | 12 | 13 |
| Alopecurus myosuroides | 1 | 15 | 16 | 1 | 20 | 21 |
| Avena fatua | 0 | 10 | 11 | 1 | 10 | 11 |

| | Method B | | | | | |
|---|---|---|---|---|---|---|
| Active ingredient | III | | | IV | | |
| kg/ha | 0.1 | 1.0 | 1.2 | 0.1 | 1.0 | 1.2 |
| Crop plants: | | | | | | |
| Beta vulgaris var. crassa | 0 | 5 | 6 | 0 | 0 | 0 |
| Beta vulgaris var. altissima | 0 | 5 | 6 | 0 | 0 | 0 |

| Active ingredient | Method A | | | | | | | | |
|---|---|---|---|---|---|---|---|---|---|
| | I | | | II | | | III | | |
| kg/ha | 0.1 | 1.0 | 1.2 | 0.1 | 1.0 | 1.2 | 0.1 | 1.0 | 1.2 |
| Unwanted plants: | | | | | | | | | |
| Sinapis arvensis | 2 | 20 | 22 | 8 | 75 | 77 | | | |
| Chenopodium album | 3 | 20 | 21 | 10 | 85 | 86 | | | |
| Poa trivialis | 5 | 45 | 46 | 0 | 10 | 11 | | | |
| Alopecurus myosuroides | 4 | 50 | 52 | 1 | 10 | 11 | | | |
| Avena fatua | 8 | 50 | 51 | 2 | 20 | 22 | | | |

| | Method C | | |
|---|---|---|---|
| Active ingredient | | (I + II) + IV | |
| kg/ha | 0.1+0.1+1.0 | 0.1+1.0+0.1 | 1.0+0.1+0.1 |
| Crop plants: | | | |
| Beta vulgaris var. crassa | 0 | 0 | 0 |
| Beta vulgaris var. altissima | 0 | 0 | 0 |
| Unwanted plants: | | | |
| Sinapis arvensis | 100 | 70 | 55 |
| Chenopodium album | 100 | 85 | 60 |
| Poa trivialis | 40 | 50 | 70 |
| Alopecurus myosuroides | 45 | 56 | 90 |
| Avena fatua | 55 | 42 | 55 |
| Active ingredient | | (I + III) + IV | |
| kg/ha | 0.1+0.1+1.0 | 0.1+1.0+0.1 | 1.0+0.1+0.1 |
| Crop plants: | | | |
| Beta vulgaris var. crassa | 0 | 4 | 0 |
| Beta vulgaris var. altissima | 0 | 4 | 0 |
| Unwanted plants: | | | |
| Sinapis arvensis | 100 | 50 | 48 |
| Chenopodium album | 100 | 52 | 56 |
| Poa trivialis | 60 | 83 | 75 |
| Alopecurus myosuroides | 60 | 78 | 100 |
| Avena fatua | 55 | 75 | 72 |
| | Method C | | |
| Active ingredient | | (III + II) + IV | |
| kg/ha | 0.1+0.1+1.0 | 0.1+1.0+0.1 | 1.0+0.1+0.1 |
| Crop plants: | | | |
| Beta vulgaris var. crassa | 0 | 0 | 0 |
| Beta vulgaris var. altissima | 0 | 0 | 0 |
| Unwanted plants: | | | |
| Sinapis arvensis | 100 | 70 | 60 |
| Chenopodium album | 100 | 82 | 65 |
| Poa trivialis | 60 | 53 | 82 |
| Alopecurus myosuroides | 45 | 60 | 80 |
| Avena fatua | 53 | 40 | 75 |
| | Method C | | |
| Active ingredient | | (II + II) + IV | |
| kg/ha | 0.1+0.1+1.0 | 0.1+1.0+1.0 | 1.0+0.1+0.1 |
| Crop plants: | | | |
| Beta vulgaris var. crassa | 0 | 0 | 0 |
| Beta vulgaris var. altissima | 0 | 0 | 0 |
| Unwanted plants: | | | |
| Sinapis arvensis | 100 | 80 | 80 |
| Chenopodium album | 100 | 95 | 95 |
| Poa trivialis | 70 | 50 | 50 |
| Alopecurus myosuroides | 45 | 45 | 45 |
| Avena fatua | 50 | 40 | 40 |

0 = no damage
100 = complete destruction.

I claim:

1. A process for controlling the growth of unwanted plants with a combined effective amount of (a) and (b) wherein the soil in which unwanted plant growth is to be prevented is treated before emergence of the unwanted plants with a compound of the formula (a)

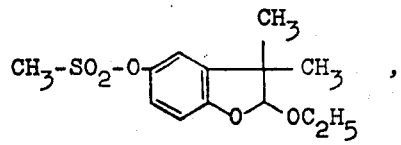

and, after emergence of the unwanted plants, the crop plants and unwanted plants are treated with (b) 1-phenyl-4-amino-5-chloropyridazone-(6) wherein the ratio of (a) to (b) is from about 1:2 to 2:1.

* * * * *